O. KUGLER.
Cultivators.

No. 141,145. Patented July 22, 1873.

Witnesses:
A. W. Almqvist
C. Sedgewick

Inventor:
O. Kugler
Per Munn & Co.
Attorneys.

UNITED STATES PATENT OFFICE.

OLIVER KUGLER, OF RARITAN, ASSIGNOR TO HIMSELF, JAMES D. McCAULEY, AND JACOB VAN FLEET, OF CLINTON, AND JOHN A. THOMPSON, OF REDDINGTON, NEW JERSEY.

IMPROVEMENT IN CULTIVATORS.

Specification forming part of Letters Patent No. 141,145, dated July 22, 1873; application filed September 14, 1872.

*To all whom it may concern:*

Be it known that I, OLIVER KUGLER, of Raritan, in the county of Somerset and State of New Jersey, have invented a new and Improved Cultivator; and I do hereby declare that the following is a full, clear, and exact description of the same, reference being had to the annexed drawing forming a part of this specification.

This invention consists in gage-bars which regulate depth of plows and give absolute steadiness to the whole machine; in gatherers which draw the loose dirt convergingly up to the row of plants; and in a loose flexible draft which gives the workman perfect command of the machine.

Figure 1:
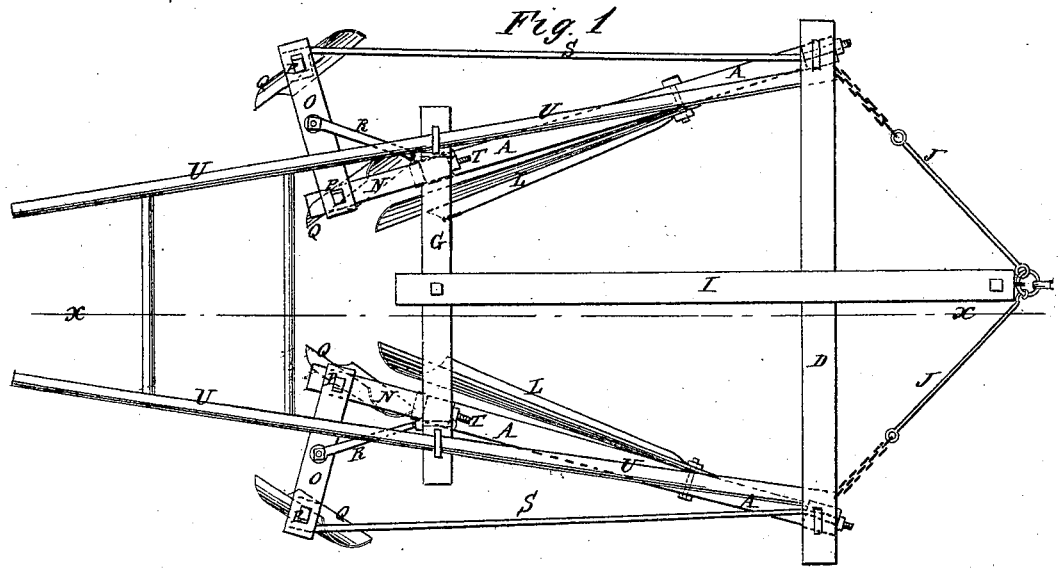
Figure 2:
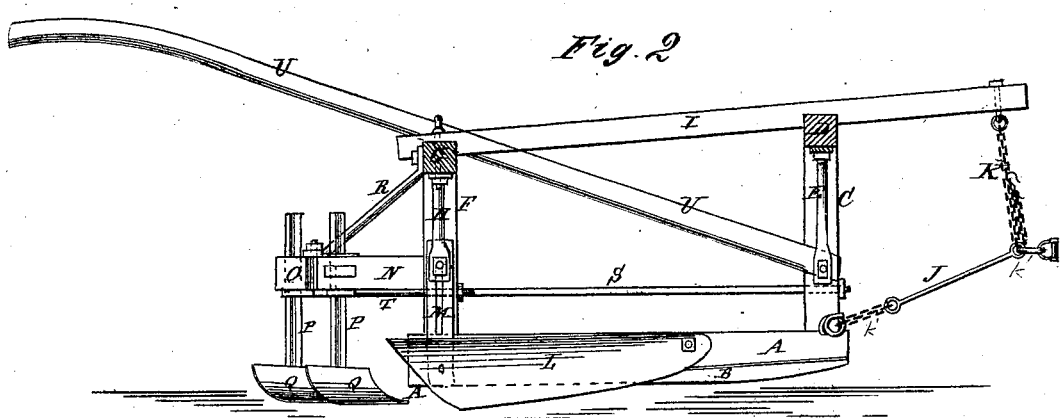
Figure 3:
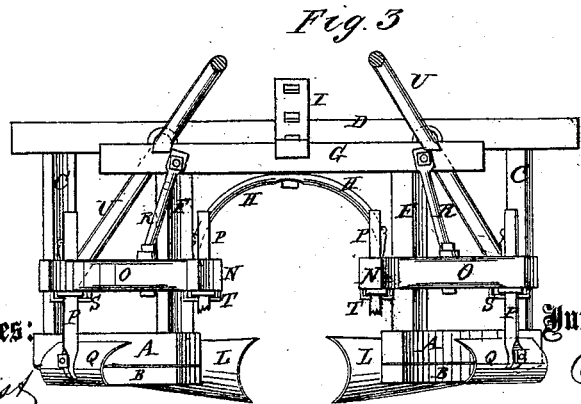

Figure 1 is a plan, Fig. 2 a longitudinal section, and Fig. 3 a rear view, of my improved machine.

B B are shoes, flat on the bottom, curved upwardly in front, wide apart in front, and converged toward the rear. These shoes are rigidly attached to the runners A A, and the two together form a gage-bar for plow and steadier for the machine. The runners receive in front the studs C that are spaced by cross-bar D and re-enforced by braces E E. F F are studs rising from the rear of runners A A, spaced by cross-bars G and braced by bars H. I is a longitudinal bar attached to cross-bars D G. On the front projecting end of bar I is a pendent chain, K, having a hook at the end. J J are two rods having an eye at each end, and united by a ring or link, $k$, in front, while in the rear each is connected with a runner by a chain, $k'$.

By this construction the draft connection is made with the ring $k$, through which the hook is passed and fastened in chain K, and by changing the hook from one link to another the line of draft may be elevated or depressed. This flexible draft gives the plowman an easy and complete control of the cultivator.

L L are concave metallic plates or soil-gatherers which gradually force the pulverized soil up to the row of plants which it straddles. These plates are pivoted in front to the inner sides of the runners A, and held in the rear by slotted adjustable and preferably elastic arms M M, whereby they may be raised or lowered to take more or less dirt. N O are angular beams which receive the square standards P that are fastened at any height by wedge-key or other suitable device. Q are plow-plates which, by being transferred to opposite sides, will throw the soil in reverse directions. R S T are braces, and U U handles attached in any suitable manner.

The operation is as follows: The cultivator straddles the row of plants, while the shoes B B glide over the surface of the ground, insuring the exact depth of culture which is required. The gatherers L L draw the fine surface soil up to the stems of the plants, thus "hilling" them to the extent intended; and the shovels Q go deeper and throw up the soil from the middle against the "hill" previously form, thus making a soil-bed of fine tilth in which the rootlets may extend at pleasure.

Having thus described my invention, what I claim as new, and desire to secure by Letters Patent, is—

1. The combination, with gatherers L L, of arms M M, arranged as and for purpose specified.

2. The hook-chain K on projecting end of bar I, ring $k$, rods J J, and chains $k'\ k'$, combined and arranged with a cultivator-frame, as described, to form a flexible draft.

Witnesses:         OLIVER KUGLER.
  H. A. FLUCK,
  EZEKIEL L. EVERITT.